(12) United States Patent
Reusswig et al.

(10) Patent No.: US 11,221,802 B2
(45) Date of Patent: Jan. 11, 2022

(54) ZONE ALLOCATION FOR DATA STORAGE DEVICE BASED ON ZONE RESET BEHAVIOR

(71) Applicant: Western Digital Technologies, Inc., San Jose, CA (US)

(72) Inventors: Phil Reusswig, Santa Clara, CA (US); Yosief Ataklti, Fremont, CA (US)

(73) Assignee: Western Digital Technologies, Inc., San Jose, CA (US)

(*) Notice: Subject to any disclaimer, the term of this patent is extended or adjusted under 35 U.S.C. 154(b) by 0 days.

(21) Appl. No.: 16/897,499

(22) Filed: Jun. 10, 2020

(65) Prior Publication Data

US 2021/0389911 A1 Dec. 16, 2021

(51) Int. Cl.
*G06F 3/06* (2006.01)
*G06F 12/02* (2006.01)
*G06F 12/0891* (2016.01)

(52) U.S. Cl.
CPC ............ *G06F 3/0679* (2013.01); *G06F 3/064* (2013.01); *G06F 3/0607* (2013.01); *G06F 12/0246* (2013.01); *G06F 12/0891* (2013.01)

(58) Field of Classification Search
CPC ...... G06F 3/0679; G06F 3/064; G06F 3/0607; G06F 12/0246; G06F 12/0891
See application file for complete search history.

(56) References Cited

U.S. PATENT DOCUMENTS

| 10,768,857 | B2* | 9/2020 | Zhou | G06F 12/1009 |
| 2016/0011971 | A1* | 1/2016 | Lee | G06F 12/0246 |
| | | | | 711/103 |
| 2017/0147237 | A1* | 5/2017 | Fang | G06F 3/0647 |

* cited by examiner

*Primary Examiner* — David Yi
*Assistant Examiner* — Dustin B. Fulford
(74) *Attorney, Agent, or Firm* — Michael Best & Friedrich LLP

(57) ABSTRACT

A memory controller includes, in one implementation, a host interface, a memory interface, and a flash translation layer (FTL). The FTL is configured to receive a request from a host device to store data in a zone of a solid-state memory. The FTL is also configured to determine a zone reset rate classification as one of a hot classification, a cold classification, and a normal classification. The FTL is further configured to allocate the zone to a memory die with the fewest free die blocks when the zone reset rate classification is the hot classification. The FTL is also configured to allocate the zone to a memory die with the most free die blocks when the zone reset rate classification is the cold classification. The FTL is further configured to send the data to the memory die for storage therein.

20 Claims, 3 Drawing Sheets

ZONE ALLOCATION FOR DATA STORAGE DEVICE BASED ON ZONE RESET BEHAVIOR

BACKGROUND

This application relates generally to memory devices, and more particularly, to a controller that allocates zones in a memory based on zone reset rate.

Many solid-state drives use NAND flash for storage. In NAND flash, there is a mismatch between the program (string) and erase (block) size. This requires a flash translation layer between the host and the NAND flash to manage the problems that arise from the mismatch between program and erase (for example, write amplification, wear leveling, compaction, etc.). Zoned Namespace ("ZNS") solid-state drives are designed to be more optimized for NAND flash. In some ZNS systems, a zone capacity matches the capacity of a NAND die block. This capacity matching simplifies much of the flash translation layer's operations because data is written sequentially to each zone. For example, the capacity matching allows the host to make use of nearly all die blocks on the solid-state drive by eliminating the need for virtual blocks. While this results in lower costs (for example, drive cost) for the host, it also introduces new challenges for the flash translation layer. For example, each physical die does not have the same number of bad blocks. Thus, in ZNS, each die has different capacity. Assuming each die has the same rate of data write and the same rate of data invalidation (i.e., zone reset), each die can reach physical fullness at different times. If a die reaches capacity, that die will go offline and reduce the system performance due to reduced parallelism. Thus, a method is needed for allocating zones in ZNS systems to prevent dies from reaching capacity.

SUMMARY

Each zone in a Zoned Namespace ("ZNS") system will not be invalidated at the same rate. Some zones (referred to herein as "cold zones") will be reset only a few times, and thus will consume die blocks for a long time. Some zones (referred to herein as "hot zones") will be reset many times, and thus will be released from die blocks after a short time. The present disclosure provides devices, methods, and apparatuses that, among other things, allocate cold zones to dies with the highest quantities of free die blocks and hot zones to dies with the fewest quantities of free die blocks. In this manner, dies are prevented from reaching full capacity because die capacity is maintained based on host behavior.

The present disclosure provides a memory controller including, in one implementation, a host interface, a memory interface, and a flash translation layer. The host interface is configured to interface with a host device. The memory interface is configured to interface with a solid-state memory. The flash translation layer is coupled to the host interface and the memory interface. The flash translation layer is configured to receive a request from the host device by way of the host interface to store data in a zone of the memory. The flash translation layer is also configured to determine a zone reset rate classification for the zone as one of a hot classification, a cold classification, and a normal classification. The flash translation layer is further configured to allocate the zone to a die in the memory based on the zone reset rate classification. The zone is allocated to the die with fewest free die blocks when the zone reset rate classification is the hot classification. The zone is allocated to the die with most free die blocks when the zone reset rate classification is the cold classification. The flash translation layer is also configured to send the data to the die in the memory by way of the memory interface for storage in the memory.

The present disclosure also provides a method including receiving a request from a host device to store data in a zone of a solid-state memory. The method also includes determining, with a flash translation layer, a zone reset rate classification for the zone as one of a hot classification, a cold classification, and a normal classification. The method further includes allocating, with the flash translation layer, the zone to a die in the memory based on the zone reset rate classification. The zone is allocated to the die with fewest free die blocks when the zone reset rate classification is the hot classification. The zone is allocated to the die with most free die blocks when the zone reset rate classification is the cold classification. The method also includes sending the data to the die in the memory for storage therein.

The present disclosure also provides an apparatus including, in one implementation, means for receiving a request from a host device to store data in a zone of a solid-state memory; means for determining a zone reset rate classification for the zone as one of a hot classification, a cold classification, and a normal classification; means for allocating the zone to a die in the memory based on the zone reset rate classification; and means for sending the data to the die in the memory for storage therein. The zone is allocated to the die with fewest free die blocks when the zone reset rate classification is the hot classification. The zone is allocated to the die with most free die blocks when the zone reset rate classification is the cold classification.

Various aspects of the present disclosure provide for improvements in memory devices. The present disclosure can be embodied in various forms, including hardware or circuits controlled by software and/or firmware. The foregoing summary is intended solely to give a general idea of various aspects of the present disclosure and does not limit the scope of the present disclosure in any way.

DETAILED DESCRIPTION

In the following description, numerous details are set forth, such as data storage device configurations, controller operations, and the like, in order to provide an understanding of one or more aspects of the present disclosure. It will be readily apparent to one skilled in the art that these specific details are merely exemplary and not intended to limit the scope of this application. In particular, the functions associated with the flash translation layer may be performed by hardware (for example, analog or digital circuits), a combination of hardware and software (for example, program code or firmware stored in a non-transitory computer-readable medium that is executed by a processor or control circuitry), or any other suitable means. The following description is intended solely to give a general idea of various aspects of the present disclosure and does not limit the scope of the disclosure in any way. Furthermore, it will be apparent to those of skill in the art that, although the present disclosure refers to NAND flash, the concepts discussed herein are applicable to other types of solid-state memory, such as NOR, PCM (Phase Change Memory), ReRAM, etc.

Figure 1:
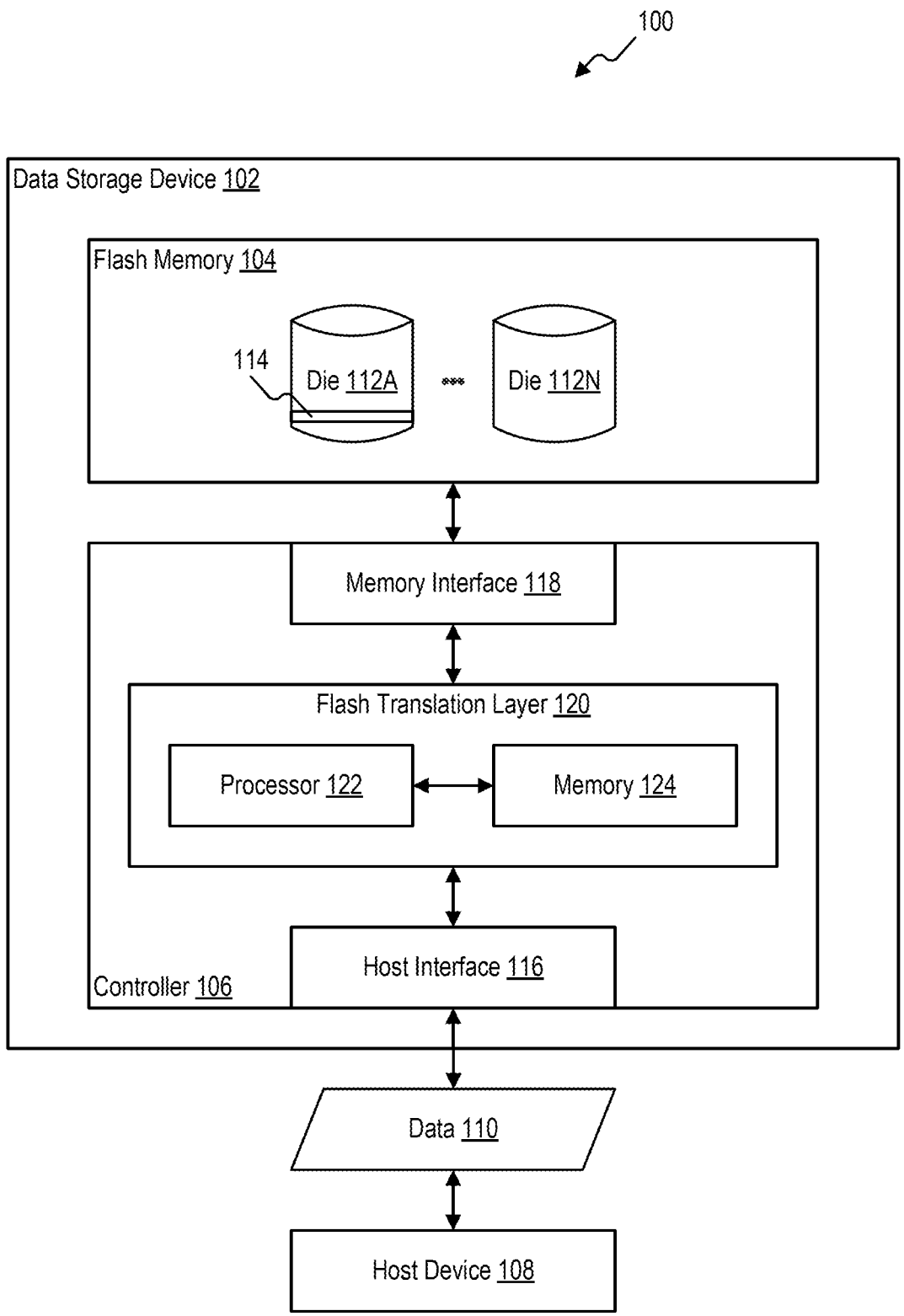
FIG. 1 is block diagram of one example of a system including a data storage device, in accordance with some implementations of the present disclosure.

FIG. 1 is block diagram of one example of a system 100 that includes a data storage device 102. In some implementations, the data storage device 102 is a flash memory device. For example, the data storage device 102 is a Secure Digital SD® card, a microSD® card, or another similar type of data storage device. The data storage device 102 illustrated in FIG. 1 includes a flash memory 104 and a controller 106. The data storage device 102 is coupled to a host device 108. The host device 108 is configured to provide data 110 (for example, user data) to the data storage device 102 to be stored, for example, in the flash memory 104. The host device 108 is also configured to request data 110 to be read from the flash memory 104. The host device 108 is, for example, a computer, a server, an access terminal, or another similar device.

The flash memory 104 of the data storage device 102 is coupled to the controller 106. In some implementations, the flash memory 104 is NAND flash memory. The flash memory 104 illustrated in FIG. 1 includes a plurality of dies 112A-112N (for example, NAND dies). Each of the plurality of dies 112A-112N includes a plurality of die blocks. For example, in FIG. 1, the die 112A includes a representative die block 114.

The controller 106 illustrated in FIG. 1 includes a host interface 116, a memory interface 118, and a flash translation layer 120. The controller 106 is illustrated in FIG. 1 in a simplified form. One skilled in the art would recognize that a controller for a flash memory would include additional modules or components other than those specifically illustrated in FIG. 1. Additionally, although the data storage device 102 is illustrated in FIG. 1 as including the controller 106, in other implementations, the controller 106 is instead located within the host device 108 or is otherwise separate from the data storage device 102. As a result, operations that would normally be performed by the controller 106 (for example, wear leveling, bad block management, data scrambling, garbage collection, address mapping, etc.) can be performed by the host device 108 or another device that connects to the data storage device 102.

The controller 106 is configured to send data to, and receive data and instructions from, the host device 108 via the host interface 116. The host interface 116 enables the host device 108 to, for example, read from the flash memory 104 and to write to the flash memory 104 using any suitable communication protocol. Suitable communication protocols include, for example, the Universal Flash Storage ("UFS") Host Controller Interface specification, the Secure Digital ("SD") Host Controller specification, etc.

The controller 106 is also configured to send data and commands to, and receive data from, the flash memory 104 via the memory interface 118. As an illustrative example, the controller 106 is configured to send data and a write command to instruct the flash memory 104 to store data in a particular die block in die 112A. The controller 106 is also configured to send a read command to the flash memory 104 to read data from a particular die block in the flash memory 104.

The flash translation layer 120 illustrated in FIG. 1 includes an processor 122 (for example, a microprocessor, a microcontroller, a field-programmable gate array ["FPGA"] semiconductor, an application specific integrated circuit ["ASIC"], or another suitable programmable device) and a non-transitory computer readable medium or memory 124 (for example, including random access memory ["RAM"] and read only memory ["ROM"]). The processor 122 is operatively connected to the various modules within the flash translation layer 120, the controller 106, and the data storage device 102. For example, firmware is loaded in a ROM of the memory 124 as computer executable instructions. Those computer executable instructions are capable of being retrieved from the memory 124 and executed by the processor 122 to control the operation of the flash translation layer 120 and perform the processes described herein. In some implementations, one or more modules of the flash translation layer 120 correspond to separate hardware components within the flash translation layer 120. In other implementations, one or more modules of the flash translation layer 120 correspond to software stored within the memory 124 and executed by the processor 122. The memory 124 is configured to store data used by the flash translation layer 120 during operation.

The flash translation layer 120 is configured to write data to zones of the flash memory 104. The number of pages included in one zone matches the size of one die block in the flash memory 104. Further, the flash translation layer 120 is configured to write data to zones in a sequential manner (i.e., writing from page 0 to page n, where page n is the last page in a zone). Thus, the flash translation layer 120 is configured to fill up one die block when writing data to a zone. Further, the flash translation layer 120 is configured to reset an entire die block (i.e., every page in the die block) when resetting a zone.

Figure 2:
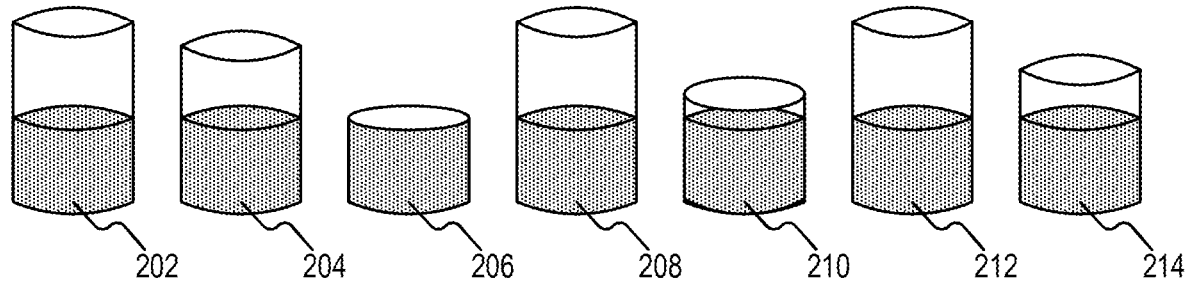
FIG. 2 is diagram of one example of a plurality of NAND dies with different zone storage capacities, in accordance with some implementations of the present disclosure.

A bad die block is a die block that is no longer reliable for storing and retrieving data because it has been physical damaged or corrupted. Each of the plurality of dies 112A-112N in the flash memory 104 has essentially the same quantity of total die blocks. However, each of the plurality of dies 112A-112N in the flash memory 104 does not have the same quantity of bad die blocks. Thus, each of the plurality of dies 112A-112N in the flash memory 104 does not have the same quantity of good die blocks. As described above, one zone fills up one die block. Thus, the zone storage capacity of each of the plurality of dies 112A-112N in the flash memory 104 is different because each die has a different quantity of good die blocks. FIG. 2 illustrates an example of different zone storage capacities for a plurality of NAND dies 202-214. The zone storage capacity of each NAND die included in FIG. 2 is represented by its height. For example, NAND die 202 has more zone storage capacity than NAND die 204 because NAND die 202 is taller than NAND die 204. The height of each NAND die included in FIG. 2 also represents the quantity of good die blocks included therein. The shaded portion of each NAND die in FIG. 2 represents the amount of valid data stored therein.

Assuming each NAND die illustrated in FIG. 2 has the same rate of data write and the same rate of data invalidation (i.e., zone reset), each NAND die reaches physical fullness at the different times. However, each of the zones of the flash memory 104 will not be invalidated (i.e., reset) at the same rate. Some zones (referred to herein as "cold zones") will be reset only a few times, and thus will consume die blocks for a long time. Some zones (referred to herein as "hot zones") will be reset many times, and thus will be released from die blocks after a short time. The flash translation layer 120 is configured to allocate cold zones to dies with the highest quantities of free die blocks and hot zones to dies with the fewest quantities of free die blocks. In this manner, dies are prevented from reaching full capacity because die capacity is maintained based on host behavior.

Figure 3:
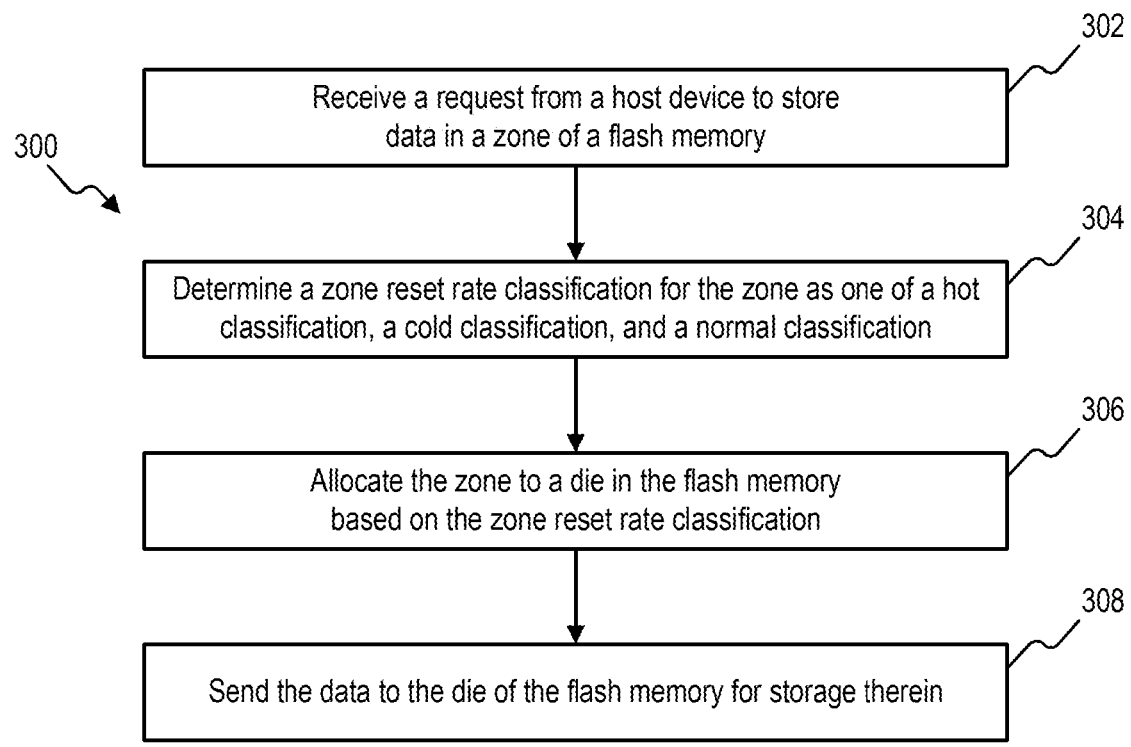
FIG. 3 is a flow diagram of an example of a method for allocating a zone of a flash memory based on a zone reset rate, in accordance with some implementations of the present disclosure.

FIG. 3 is a flow diagram of one example of a method 300 for allocating a zone of the flash memory 104 based on a zone reset rate. At block 302, a request to store data to a zone of the flash memory 104 is received from the host device 108. For example, the flash translation layer 120 may receive the request from the host device 108 via the host interface 116. At block 304, a zone reset rate classification for the zone is determined as one of a hot classification, a cold classification, and a normal classification. The zone reset rate classification indicates how often the zone is reset by the host device 108. The hot classification is assigned to zones that undergo a large number of zone resets. The cold classification is assigned to zones that undergo a small number of zone resets. The normal classification is assigned to zones that undergo an average number of zone resets. Different implementations for determining the zone reset rate classification are described in detail further below.

At block 306, the zone is allocated to a die in the flash memory 104 based on the zone reset rate classification. When the zone reset rate classification is the hot classification, the flash translation layer 120 allocates the zone to the die with the fewest free die blocks. Further, when the zone reset rate classification is the cold classification, the flash translation layer 120 allocates the zone to the die with most free die blocks. As used herein, the term "free die blocks" refers to good die blocks that are not currently storing valid data. In some implementations, the flash translation layer 120 is configured to allocate the zone to any die in the flash memory 104 with free die blocks when the zone reset rate classification is the normal classification.

At block 308, the data is sent to the die in the flash memory 104 for storage therein. For example, the flash translation layer 120 sends data and a write command via the memory interface 118 to instruct the flash memory 104 to store the data in the allocated die.

In some implementations, the flash translation layer 120 is configured to determine the zone reset rate classification for a zone based on an indication received from the host device 108. For example, when the host device 108 sends a request to open a zone, the request may include an indication of whether the zone is hot, cold, or normal. Alternatively, or in addition, in some implementations, the flash translation layer 120 is configured to determine the zone reset rate classification for a zone based on the total number of times the zone is reset. For example, for each zone in the flash memory 104, the flash translation layer 120 may increment a zone reset counter each time the host device 108 resets the zone and determine the zone reset rate classification for the zone based on the zone reset counter. Separate zone rest counters may be used for each zone in the flash memory 104.

Figure 4:
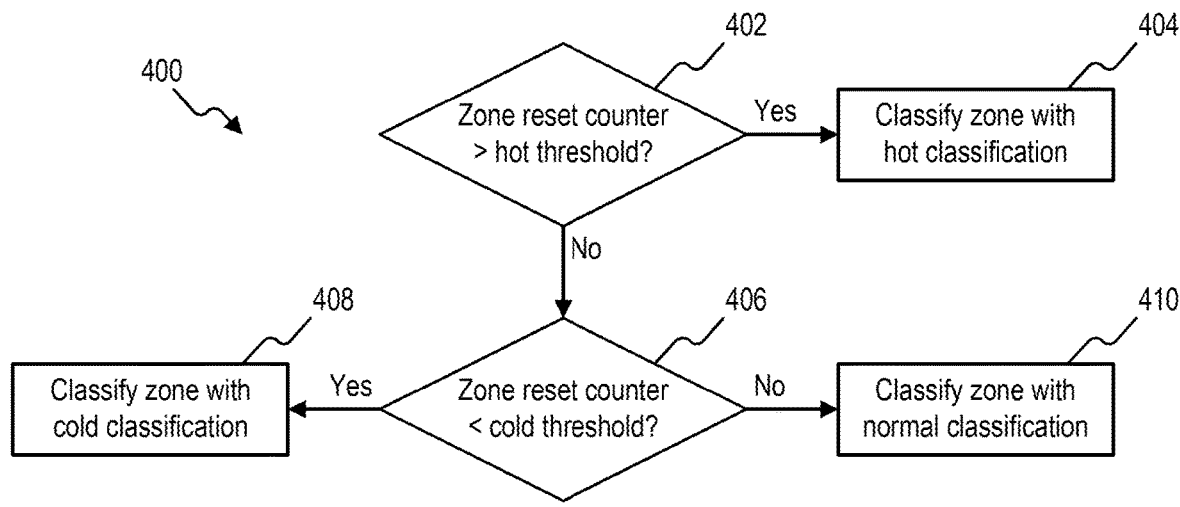
FIG. 4 is a flow diagram of an example of a method for determining a zone reset rate classification based on a zone reset counter, in accordance with some implementations of the present disclosure.

FIG. 4 is a flow diagram of one example of a method 400 for determining a zone reset rate classification for a zone based on a zone reset counter. At block 402, the flash translation layer 120 determines whether the zone reset counter is greater than a hot threshold. When the zone reset counter is greater than the hot threshold, the flash translation layer 120 classifies the zone with the hot classification at block 404. Alternatively, when the zone reset counter is less than the hot threshold, the method 400 proceeds to block 406. At block 406, the flash translation layer 120 determines whether the zone reset counter is less than a cold threshold. The cold threshold is less than the hot threshold. When the zone reset counter is less than the cold threshold, the flash translation layer 120 classifies the zone with the cold classification at block 408. Alternatively, when the zone reset counter is greater than the cold threshold, the flash translation layer 120 classifies the zone with the normal classification at block 410.

In some implementations, the flash translation layer 120 is configured to determine the hot threshold and the cold threshold based on the total number of zone resets for the flash memory 104. For example, the flash translation layer 120 may set the cold threshold to 10% of the total number of zone resets and set the hot threshold to 90% of the total number of zone resets. The total number of zone rests for the flash memory 104 is the total number of times any zone in the flash memory 104 is reset. In some implementations, the flash translation layer 120 is configured to determine the total number of zone resets for the flash memory 104 by adding the values of the zone reset counters for all of the zones in the flash memory 104.

Figure 5:
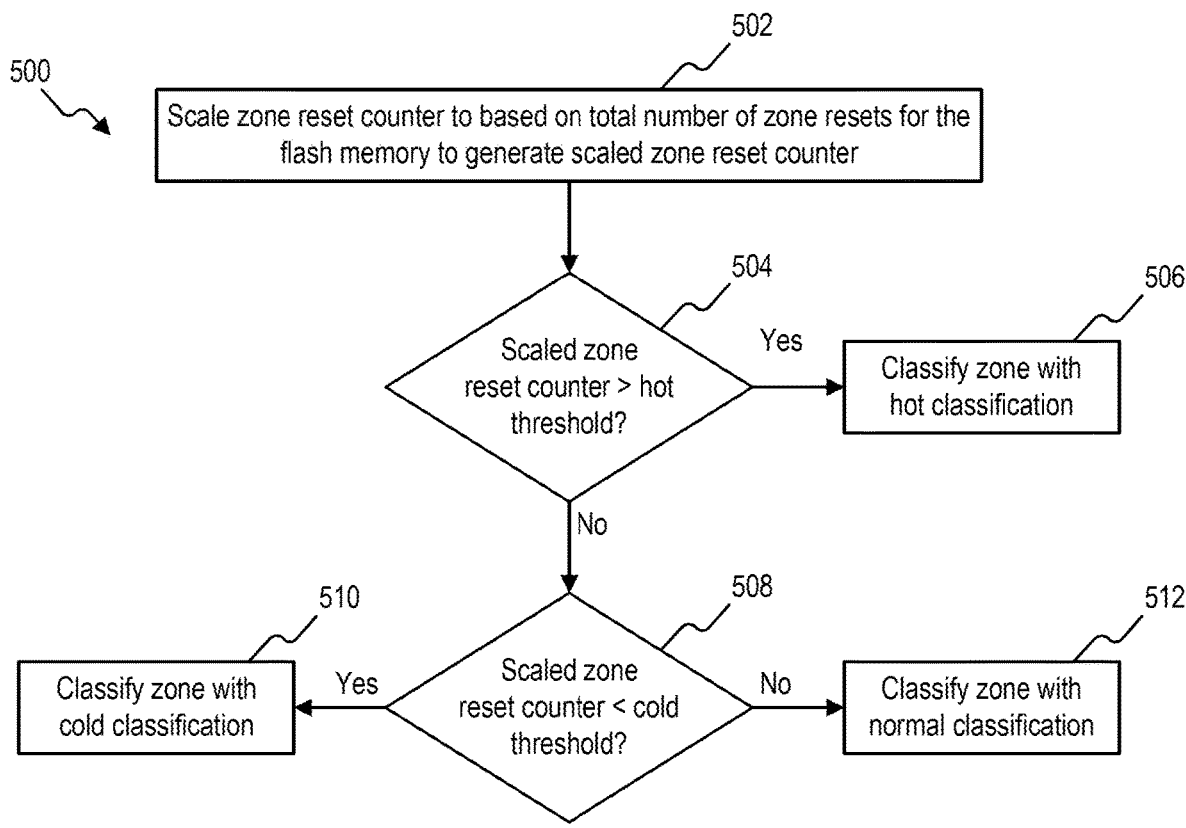
FIG. 5 is a flow diagram of an example of a method for determining a zone reset rate classification based on a scaled zone reset counter, in accordance with some implementations of the present disclosure.

In some implementations, the zone reset counter is scaled based on the total number of zone resets for the flash memory 104. FIG. 5 is a flow diagram of one example of a method 500 for determining a zone reset rate classification for a zone based on a scaled zone reset counter. At block 502, the flash translation layer 120 scales the zone reset counter based on the total number on zone resets for the flash memory 104 to generate a scaled zone reset counter. In some implementations, the flash translation layer 120 is configured to generate the scaled zone reset counter by dividing the zone reset counter by the total number of zone resets for the flash memory 104. At block 504, the flash translation layer 120 determines whether the scaled zone reset counter is greater than a hot threshold. When the scaled zone reset counter is greater than the hot threshold, the flash translation layer 120 classifies the zone with the hot classification at block 506. Alternatively, when the scaled zone reset counter is less than the hot threshold, the method 500 proceeds to block 508. At block 508, the flash translation layer 120 determines whether the scaled zone reset counter is less than a cold threshold. When the scaled zone reset counter is less than the cold threshold, the flash translation layer 120 classifies the zone with the cold classification at block 510. Alternatively, when the zone reset counter is greater than the cold threshold, the flash translation layer 120 classifies the zone with the normal classification at block 512.

In connection with the disclosed implementations, an apparatus includes means for receiving a request from a host device to store data in a zone of a flash memory. The means for receiving a request may correspond, for example, to the host interface 116, the flash translation layer 120, or a combination of the two. The apparatus also includes means for determining a zone reset rate classification for the zone as one of a hot classification, a cold classification, and a normal classification. The means for determining the zone rate classification may correspond, for example, to the flash translation layer 120. The apparatus further includes means for allocating the zone to a die in the flash memory based on the zone reset rate classification. The means for allocating the zone may correspond, for example, to the flash translation layer 120. The apparatus also include means for sending the data to the die in the flash memory for storage therein.

The means for sending the data may correspond, for example, to the memory interface 118, the flash translation layer 120, or a combination of the two.

In some implementations, the means for determining the zone reset rate classification is configured to increment a zone reset counter each time the zone is reset, classify the zone with the hot classification when the zone reset counter is greater than a hot threshold, classify the zone with the cold classification when the zone reset counter is less than a cold threshold, and classify the zone with the normal classification when the zone reset counter is between the hot threshold and the cold threshold.

In some implementations, the apparatus further includes means for determining the hot threshold and the cold threshold based on a total number of zone resets for the flash memory. The means for determining the hot threshold and the cold threshold may correspond, for example, to the flash translation layer 120.

In some implementations, the means for determining the zone reset rate classification is configured to increment a zone reset counter each time the zone is reset, scale the zone reset counter based on a total number of zone resets for the flash memory to generate a scaled zone reset counter, classify the zone with the hot classification when the scaled zone reset counter is greater than a hot threshold, classify the zone with the cold classification when the scaled zone reset counter is less than a cold threshold, and classify the zone with the normal classification when the scaled zone reset counter is between the hot threshold and the cold threshold.

In some implementations, the means for determining the zone reset rate classification is configured to determine the zone reset rate classification based on an indication received from the host device. In some implementations, the means for allocating the zone is configured to allocate the zone to any die in the flash memory with free die blocks when the zone reset rate classification is the normal classification.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain implementations and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A memory controller, comprising:
a host interface configured to interface with a host device;
a memory interface configured to interface with a solid-state memory; and
a flash translation layer coupled to the host interface and the memory interface, wherein the flash translation layer is configured to:
receive a request from the host device by way of the host interface to store data in a zone of the memory,
determine a zone reset rate classification for the zone as one of a hot classification, a cold classification, and a normal classification, the zone reset rate classification indicating an invalidation rate of the data stored in the zone,
allocate the zone to a die in the memory based on the zone reset rate classification, wherein the zone is allocated to the die with fewest free die blocks when the zone reset rate classification is the hot classification, and wherein the zone is allocated to the die with most free die blocks when the zone reset rate classification is the cold classification, and
send the data to the die in the memory by way of the memory interface for storage in the memory.

2. The memory controller of claim 1, wherein, to determine the zone reset rate classification, the flash translation layer is further configured to:
increment a zone reset counter each time the zone is reset,
classify the zone with the hot classification when the zone reset counter is greater than a hot threshold,
classify the zone with the cold classification when the zone reset counter is less than a cold threshold, and
classify the zone with the normal classification when the zone reset counter is between the hot threshold and the cold threshold.

3. The memory controller of claim 2, wherein the flash translation layer is further configured to determine the hot threshold and the cold threshold based on a total number of zone resets for the memory.

4. The memory controller of claim 1, wherein, to determine the zone reset rate classification, the flash translation layer is further configured to:
increment a zone reset counter each time the zone is reset,
scale the zone reset counter based on a total number of zone resets for the memory to generate a scaled zone reset counter,
classify the zone with the hot classification when the scaled zone reset counter is greater than a hot threshold, classify the zone with the cold classification when the scaled zone reset counter is less than a cold threshold, and classify the zone with the normal classification when the scaled zone reset counter is between the hot threshold and the cold threshold.

5. The memory controller of claim 1, wherein, to determine the zone reset rate classification, the flash translation layer is further configured to determine the zone reset rate classification based on an indication received from the host device.

6. The memory controller of claim 5, wherein the flash translation layer receives the indication from the host device when the zone is opened.

7. The memory controller of claim 6, wherein the zone is allocated to any die in the memory with free die blocks when the zone reset rate classification is the normal classification.

8. A method, comprising:
receiving a request from a host device to store data in a zone of a solid-state memory;
determining, with a flash translation layer, a zone reset rate classification for the zone as one of a hot classification, a cold classification, and a normal classification;
allocating, with the flash translation layer, the zone to a die in the memory based on the zone reset rate classification, wherein the zone is allocated to the die with fewest free die blocks when the zone reset rate classification is the hot classification, the zone reset rate classification indicating an invalidation rate of the data stored in the zone, and wherein the zone is allocated to the die with most free die blocks when the zone reset rate classification is the cold classification; and
sending the data to the die in the memory for storage therein.

9. The method of claim 8, wherein determining the zone reset rate classification further includes:
incrementing a zone reset counter each time the zone is reset,
classifying the zone with the hot classification when the zone reset counter is greater than a hot threshold,
classifying the zone with the cold classification when the zone reset counter is less than a cold threshold, and
classifying the zone with the normal classification when the zone reset counter is between the hot threshold and the cold threshold.

10. The method of claim 9, further comprising determining, with the flash translation layer, the hot threshold and the cold threshold based on a total number of zone resets for the memory.

11. The method of claim 8, wherein determining the zone reset rate classification further includes:
incrementing a zone reset counter each time the zone is reset,
scaling the zone reset counter based on a total number of zone resets for the memory to generate a scaled zone reset counter,
classifying the zone with the hot classification when the scaled zone reset counter is greater than a hot threshold,
classifying the zone with the cold classification when the scaled zone reset counter is less than a cold threshold, and
classifying the zone with the normal classification when the scaled zone reset counter is between the hot threshold and the cold threshold.

12. The method of claim 8, wherein determining the zone reset rate classification further includes determining the zone reset rate classification based on an indication received from the host device.

13. The method of claim 12, wherein the indication is received from the host device when the zone is opened.

14. The method of claim 8, wherein the zone is allocated to any die in the memory with free die blocks when the zone reset rate classification is the normal classification.

15. An apparatus, comprising:
means for receiving a request from a host device to store data in a zone of a solid-state memory;
means for determining a zone reset rate classification for the zone as one of a hot classification, a cold classification, and a normal classification the zone reset rate classification indicating an invalidation rate of the data stored in the zone;
means for allocating the zone to a die in the memory based on the zone reset rate classification, wherein the zone is allocated to the die with fewest free die blocks when the zone reset rate classification is the hot classification, and wherein the zone is allocated to the die with most free die blocks when the zone reset rate classification is the cold classification; and
means for sending the data to the die in the memory for storage therein.

16. The apparatus of claim 15, wherein the means for determining the zone reset rate classification is further configured to:
increment a zone reset counter each time the zone is reset,
classify the zone with the hot classification when the zone reset counter is greater than a hot threshold,
classify the zone with the cold classification when the zone reset counter is less than a cold threshold, and
classify the zone with the normal classification when the zone reset counter is between the hot threshold and the cold threshold.

17. The apparatus of claim 16, further comprising means for determining the hot threshold and the cold threshold based on a total number of zone resets for the memory.

18. The apparatus of claim 15, wherein the means for determining the zone reset rate classification is further configured to:
increment a zone reset counter each time the zone is reset,
scale the zone reset counter based on a total number of zone resets for the memory to generate a scaled zone reset counter,
classify the zone with the hot classification when the scaled zone reset counter is greater than a hot threshold,
classify the zone with the cold classification when the scaled zone reset counter is less than a cold threshold, and
classify the zone with the normal classification when the scaled zone reset counter is between the hot threshold and the cold threshold.

19. The apparatus of claim 15, wherein the means for determining the zone reset rate classification is further configured to determine the zone reset rate classification based on an indication received from the host device.

20. The apparatus of claim 15, wherein the means for allocating the zone is further configured to allocate the zone to any die in the memory with free die blocks when the zone reset rate classification is the normal classification.

* * * * *